(12) United States Patent
Rezaei et al.

(10) Patent No.: US 10,606,842 B2
(45) Date of Patent: *Mar. 31, 2020

(54) CROSS-MODEL FILTERING

(71) Applicant: MICROSOFT TECHNOLOGY LICENSING, LLC, Redmond, WA (US)

(72) Inventors: Pedram Faghihi Rezaei, Seattle, WA (US); Amir M. Netz, Bellevue, WA (US); Patrick J. Baumgartner, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 358 days.

This patent is subject to a terminal disclaimer.

(21) Appl. No.: 15/659,246

(22) Filed: Jul. 25, 2017

(65) Prior Publication Data

US 2017/0322978 A1 Nov. 9, 2017

Related U.S. Application Data

(63) Continuation of application No. 13/919,857, filed on Jun. 17, 2013, now Pat. No. 9,720,972.

(51) Int. Cl.
  *G06F 16/2455* (2019.01)
  *G06F 16/215* (2019.01)
  *G06Q 30/06* (2012.01)

(52) U.S. Cl.
  CPC ...... *G06F 16/24564* (2019.01); *G06F 16/215* (2019.01); *G06F 16/24553* (2019.01); *G06Q 30/06* (2013.01)

(58) Field of Classification Search
  CPC ......... G06F 16/24564; G06F 16/24553; G06F 16/215; G06Q 30/06
  (Continued)

(56) References Cited

U.S. PATENT DOCUMENTS

| 5,418,943 A | 5/1995 | Borgida et al. |
| 6,437,785 B1 * | 8/2002 | Light .................. G06F 3/0481 345/473 |

(Continued)

FOREIGN PATENT DOCUMENTS

| CN | 1508727 A | 6/2004 |
| CN | 102982098 A * | 3/2013 ........... G06F 16/951 |

(Continued)

OTHER PUBLICATIONS

Tableau website, "Filter Data Across Multiple Data Sources", 8 pages, accessed online at <https://help.tableau.com/current/pro/desktop/en-gb/filter_across_datasources.htm> on Sep. 14, 2019. (Year: 2019).*

(Continued)

*Primary Examiner* — Phuong Thao Cao
(74) *Attorney, Agent, or Firm* — Workman Nydegger

(57) ABSTRACT

Presenting data from different data providers in a correlated fashion. A first query is performed on a first data set controlled by a first entity to capture a first set of data results. Then a second query is performed on a second data set controlled by a second entity to capture a second set of data results. A relationship ontology that correlates data stored in different data stores controlled by different entities is then consulted to identify one or more relationships between data in the selected results set and the second data set.

17 Claims, 4 Drawing Sheets

(58) Field of Classification Search
USPC ........................................................ 707/775
See application file for complete search history.

(56) References Cited

U.S. PATENT DOCUMENTS

| | | | |
|---|---|---|---|
| 6,484,149 B1* | 11/2002 | Jammes | G06Q 30/02 |
| | | | 705/26.62 |
| 6,519,618 B1 | 2/2003 | Snyder | |
| 6,775,674 B1 | 8/2004 | Agassi et al. | |
| 6,990,238 B1 | 1/2006 | Saffer et al. | |
| 7,149,983 B1 | 12/2006 | Robertson et al. | |
| 7,386,565 B1 | 6/2008 | Singh et al. | |
| 7,509,303 B1* | 3/2009 | Chen | G06F 16/2428 |
| 7,526,425 B2 | 4/2009 | Marchisio et al. | |
| 7,542,969 B1 | 6/2009 | Rappaport et al. | |
| 8,176,440 B2* | 5/2012 | Stading | G06F 16/9038 |
| | | | 715/853 |
| 8,244,714 B1 | 8/2012 | Collins et al. | |
| 8,326,797 B2 | 12/2012 | He et al. | |
| 8,375,014 B1 | 2/2013 | Brocato et al. | |
| 8,407,238 B2 | 3/2013 | Trevor et al. | |
| 8,429,179 B1 | 4/2013 | Mirhaji | |
| 8,521,711 B2 | 8/2013 | Couch et al. | |
| 8,583,592 B2* | 11/2013 | Stading | G06F 16/9535 |
| | | | 707/602 |
| 8,972,434 B2* | 3/2015 | English | G06Q 30/0603 |
| | | | 707/765 |
| 9,009,198 B2* | 4/2015 | Seefeld | G06F 16/444 |
| | | | 707/792 |
| 9,230,210 B2 | 1/2016 | Shimizu | |
| 9,348,880 B1 | 5/2016 | Kramer et al. | |
| 9,443,021 B2* | 9/2016 | Chandra | G06F 16/951 |
| 2002/0023091 A1* | 2/2002 | Silberberg | G06F 16/27 |
| 2002/0042819 A1 | 4/2002 | Reichert et al. | |
| 2002/0133504 A1* | 9/2002 | Vlahos | G06F 16/256 |
| 2003/0179228 A1 | 9/2003 | Schreiber et al. | |
| 2004/0010491 A1 | 1/2004 | Riedinger | |
| 2004/0083199 A1 | 4/2004 | Govindugari et al. | |
| 2004/0243595 A1 | 12/2004 | Cui et al. | |
| 2005/0240392 A1* | 10/2005 | Munro, Jr. | G06Q 30/0625 |
| | | | 704/8 |
| 2006/0010156 A1* | 1/2006 | Netz | G06F 16/24556 |
| 2006/0031187 A1 | 2/2006 | Pyrce et al. | |
| 2006/0053170 A1 | 3/2006 | Hill et al. | |
| 2006/0053172 A1 | 3/2006 | Gardner et al. | |
| 2006/0074832 A1 | 4/2006 | Gardner et al. | |
| 2006/0136380 A1 | 6/2006 | Purcell | |
| 2006/0173868 A1* | 8/2006 | Angele | G06F 16/84 |
| 2006/0224692 A1 | 10/2006 | Gupta | |
| 2006/0235838 A1 | 10/2006 | Shan et al. | |
| 2006/0248045 A1 | 11/2006 | Toledano et al. | |
| 2006/0265352 A1 | 11/2006 | Chen et al. | |
| 2007/0011147 A1* | 1/2007 | Falkenberg | G06Q 10/10 |
| 2007/0038500 A1 | 2/2007 | Hammitt et al. | |
| 2007/0106520 A1 | 5/2007 | Akkiraju et al. | |
| 2007/0130108 A1 | 6/2007 | Simpson, Jr. et al. | |
| 2007/0162443 A1* | 7/2007 | Liu | G06F 16/951 |
| 2007/0198449 A1 | 8/2007 | Fokoue-Nkoutche et al. | |
| 2008/0005118 A1 | 1/2008 | Shakib et al. | |
| 2008/0040312 A1 | 2/2008 | Kolz et al. | |
| 2008/0077564 A1 | 3/2008 | Hattori | |
| 2008/0082578 A1 | 4/2008 | Hogue et al. | |
| 2008/0091633 A1 | 4/2008 | Rappaport et al. | |
| 2008/0147709 A1 | 6/2008 | Read | |
| 2008/0172360 A1 | 7/2008 | Lim et al. | |
| 2008/0243785 A1* | 10/2008 | Stading | G06F 16/9535 |
| 2009/0024631 A1 | 1/2009 | Monahan | |
| 2009/0070299 A1 | 3/2009 | Parikh et al. | |
| 2009/0089332 A1* | 4/2009 | Harger | G06F 16/215 |
| 2009/0171899 A1 | 7/2009 | Chittoor et al. | |
| 2009/0307200 A1 | 12/2009 | Ignat et al. | |
| 2009/0313268 A1 | 12/2009 | Folting et al. | |
| 2010/0011013 A1 | 1/2010 | Singh | |
| 2010/0114561 A1 | 5/2010 | Yasin | |
| 2010/0138357 A1 | 6/2010 | Mufti-Bey | |
| 2010/0161593 A1 | 6/2010 | Paulsen et al. | |
| 2010/0241610 A1* | 9/2010 | Gibson | G06F 16/34 |
| | | | 706/54 |
| 2010/0312837 A1* | 12/2010 | Bodapati | G06Q 10/107 |
| | | | 709/206 |
| 2010/0325206 A1 | 12/2010 | Dayal et al. | |
| 2011/0040796 A1 | 2/2011 | Shockro et al. | |
| 2011/0078136 A1* | 3/2011 | Ronen | G06F 16/951 |
| | | | 707/722 |
| 2011/0087670 A1* | 4/2011 | Jorstad | G06F 17/277 |
| | | | 707/741 |
| 2011/0196852 A1 | 8/2011 | Srikanth et al. | |
| 2011/0264680 A1 | 10/2011 | Lahr et al. | |
| 2012/0011126 A1 | 1/2012 | Park et al. | |
| 2012/0030202 A1 | 2/2012 | B'Far et al. | |
| 2012/0030220 A1 | 2/2012 | Edwards et al. | |
| 2012/0102002 A1* | 4/2012 | Sathyanarayana | G06F 16/215 |
| | | | 707/687 |
| 2012/0130966 A1 | 5/2012 | Schmeink et al. | |
| 2012/0166415 A1 | 6/2012 | Lewallen et al. | |
| 2012/0303356 A1 | 11/2012 | Boyle et al. | |
| 2012/0323958 A1 | 12/2012 | Dickerman et al. | |
| 2013/0006968 A1* | 1/2013 | Gusmini | G06F 16/25 |
| | | | 707/722 |
| 2013/0124555 A1 | 5/2013 | Duquene et al. | |
| 2013/0173428 A1 | 7/2013 | Moser | |
| 2013/0262449 A1 | 10/2013 | Arroyo et al. | |
| 2013/0282761 A1 | 10/2013 | Tamm et al. | |
| 2013/0297591 A1* | 11/2013 | Seefeld | G06F 16/444 |
| | | | 707/722 |
| 2013/0304799 A1 | 11/2013 | Lutter et al. | |
| 2014/0033120 A1 | 1/2014 | Bental et al. | |
| 2014/0053091 A1 | 2/2014 | Hou et al. | |
| 2014/0053209 A1 | 2/2014 | Young et al. | |
| 2014/0068733 A1* | 3/2014 | Belisario | G06F 21/46 |
| | | | 726/6 |
| 2014/0108467 A1 | 4/2014 | Tutuk et al. | |
| 2014/0114720 A1 | 4/2014 | Thind et al. | |
| 2014/0114949 A1 | 4/2014 | McClung et al. | |
| 2014/0136518 A1 | 5/2014 | Shum et al. | |
| 2014/0136552 A1 | 5/2014 | Jakobsen | |
| 2014/0164362 A1 | 6/2014 | Syed et al. | |
| 2014/0164381 A1* | 6/2014 | Sutton | G06F 16/287 |
| | | | 707/737 |
| 2014/0188931 A1 | 7/2014 | Smiling et al. | |
| 2014/0280326 A1 | 9/2014 | Tabb et al. | |
| 2014/0337331 A1 | 11/2014 | Hassanzadeh et al. | |
| 2014/0372481 A1 | 12/2014 | Faghihi Rezaei et al. | |
| 2015/0149481 A1 | 5/2015 | Lee et al. | |
| 2015/0161147 A1 | 6/2015 | Zhao et al. | |

FOREIGN PATENT DOCUMENTS

| | | |
|---|---|---|
| CN | 102999553 A | 3/2013 |
| EP | 1918827 A1 | 5/2008 |

OTHER PUBLICATIONS

"Using Analytic Services Data Mining Framework for Classification", In Hyperion White Paper, Retrieved Date: Apr. 12, 2013, 14 Pages.

"Final Office Action Issued in U.S. Appl. No. 13/919,857", dated Apr. 22, 2016, 20 Pages.

"Non Final Office Action Issued in U.S. Appl. No. 13/919,857", dated Nov. 17, 2016, 24 Pages.

"Non Final Office Action Issued in U.S. Appl. No. 13/919,857", dated Oct. 16, 2015, 21 Pages.

"Notice of Allowance Issued in U.S. Appl. No. 13/919,857", dated Apr. 11, 2017, 11 Pages.

Brueckl, Gerhard, "Resolving Many to Many Relationships Leveraging DAX Cross Table Filtering", Retrieved from <<http://blog.gbrueckl.at/2012/05/resolving-many-to-many-relationships-leveraging-dax-cross-table-filtering/>>, May 8, 2012, 11 Pages.

Dzeroski, Saso, "Multi-Relational Data Mining: An Introduction", In ACM SIGKDD Explorations Newsletter, vol. 5, Issue 1, Jul. 1, 2003, 16 Pages.

(56) References Cited

OTHER PUBLICATIONS

Gupta, et al., "BioDB: An Ontology-Enhanced Information System for Heterogeneous Biological Information", In Journal of Data & Knowledge Engineering, vol. 69, Issue 11, Nov. 1, 2010, pp. 1084-1102.
Havre, et al., "Interactive Visualization of Multiple Query Results", In Proceedings of the IEEE Symposium on Information Visualization 2001 (INFOVIS'01), Oct. 22, 2001, 8 Pages.
"International Preliminary Report on Patentability Issued in PCT patent Application No. PCT/US2014/041626", dated Sep. 16, 2015, 7 Pages.
"International Search Report and Written Opinion Issued in PCT Patent Application No. PCT/US2014/041626", dated Oct. 14, 2014, 9 Pages.
Rahm, et al., "Data Cleaning: Problems and Current Approaches", In Proceedings of IEEE Technical Bulletin on Data Engineering, vol. 23, No. 4, Dec. 2000, 11 Pages.
Tang, et al., "Inferring Social Ties across Heterogenous Networks", In Proceedings of the Fifth ACM International Conference on Web Search and Data Mining, Feb. 8, 2012, 10 Pages.
Weaver, Chris, "Multidimensional Visual Analysis Using Cross-Filtered Views", In Proceedings of IEEE Symposium on Visual Analytics Analytics Science and Technology, Oct. 19, 2008, pp. 163-170.
"First Office Action and Search Report Issued in Chinese Patent Application No. 201480034549.0", dated Mar. 26, 2018, 11 Pages.
"Decision on Rejection Issued in Chinese Patent Application No. 201480034549.0", dated Nov. 5, 2018, 8 Pages.
"Office Action Issued in European Patent Application No. 14736194.3", dated Jul. 31, 2017, 7 Pages.
"Second Written Opinion Issued in PCT Application No. PCT/US2014/041626", dated May 11, 2015, 7 Pages.

\* cited by examiner

CROSS-MODEL FILTERING

CROSS-REFERENCE TO RELATED APPLICATIONS

This application is a continuation of U.S. patent application Ser. No. 13/919,857 filed on Jun. 17, 2013, entitled "CROSS-MODEL FILTERING," which issued as U.S. Pat. No. 9,720,972 on Aug. 1, 2017, and which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available. Examples of software user interfaces include graphical user interfaces, text command line based user interface, function key or hot key user interfaces, and the like.

Due to the interconnected nature of computing systems and the richness of display options currently available on computing systems, computer users have many choices from which to obtain data, and many ways to display the obtained data. When data is obtained from a single source under control of a single entity, it is quite simple to interrelate the data and to provide different views of interrelated data in ways that can highlight the interrelationships by using known database operations and functionalities that use data keys to interrelate the data. However, when data is obtained from different sources under the control of different entities, it is difficult to interrelate the data and to show the interrelationships without gathering the data into a single database controlled by a single entity.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment. The method includes acts for presenting data from different data providers in a correlated fashion. The method includes performing a first query on a first data set controlled by a first entity to capture a first set of data results. The method further includes performing a second query on a second data set controlled by a second entity to capture a second set of data results. The method includes receiving a selection of one or more results from the first data set. The method further includes using the one or more selected results, consulting a relationship ontology that correlates data stored in different data stores controlled by different entities, to identify one or more relationships between data in the selected results set and the second data set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

As will be illustrated herein, embodiments may include functionality for performing filtering, slicing, and dicing of data across multiple different data models (e.g. databases) where the data models are separate. In particular, different data models may be controlled by different entities, and thus are not natively interrelated within the particular data models themselves. This can be accomplished using various mechanisms. An initial inference of relationships across models can be established based on reference data and a set of rules and heuristics. Also, manual definition of relationships or adjustment of the inferred relationships can be performed by a user. Cross filtering across models based on relationship information that is inferred automatically and/or explicitly defined between models can then be performed.

Figure 1A:
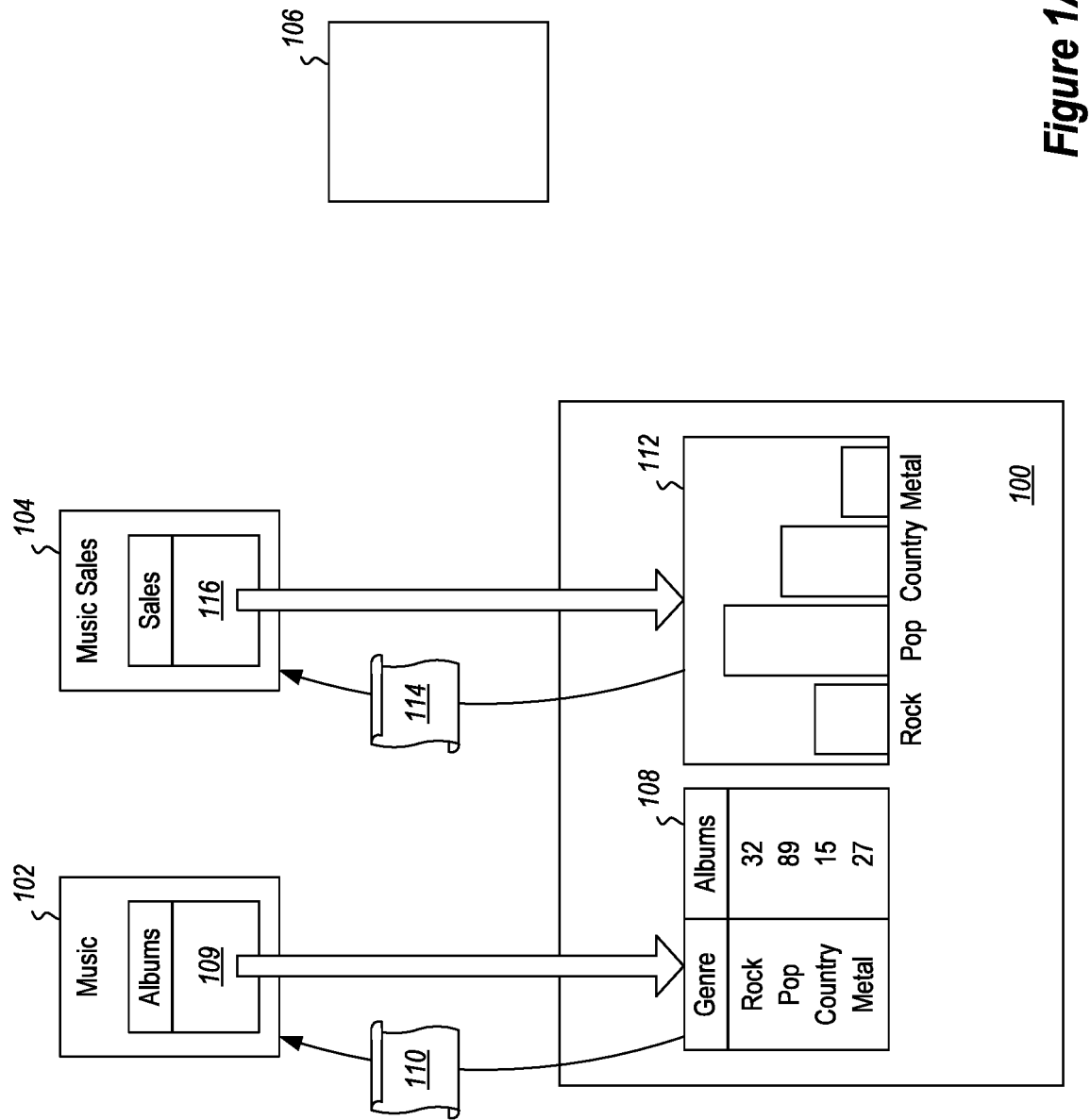
FIG. 1A illustrates database queries from a client machine on different database models and displaying visualizations based on the queries.
Figure 1B:
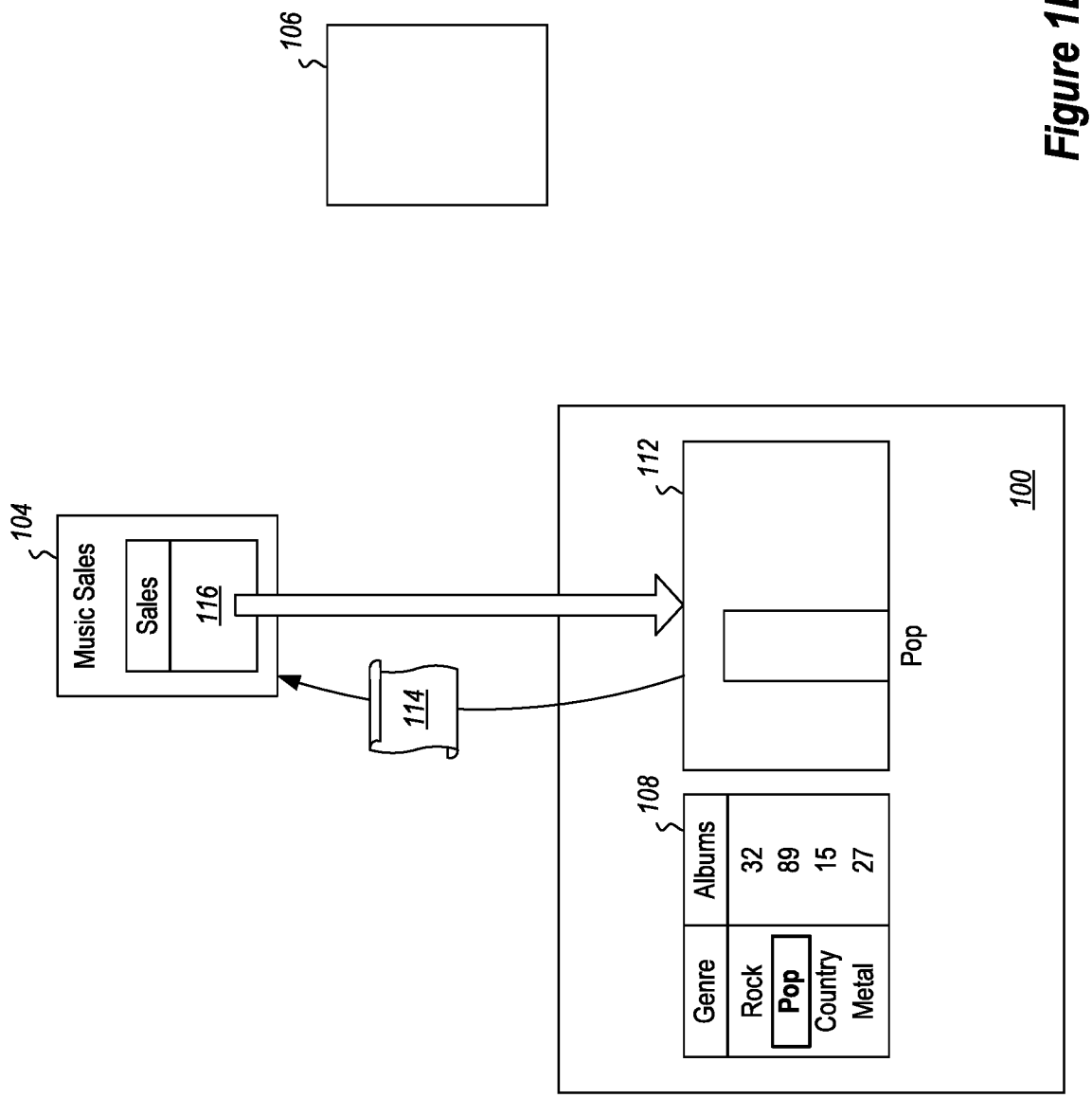
FIG. 1B illustrates cross model filtering of the different database queries from the client machine on the different database models.
Figure 1C:
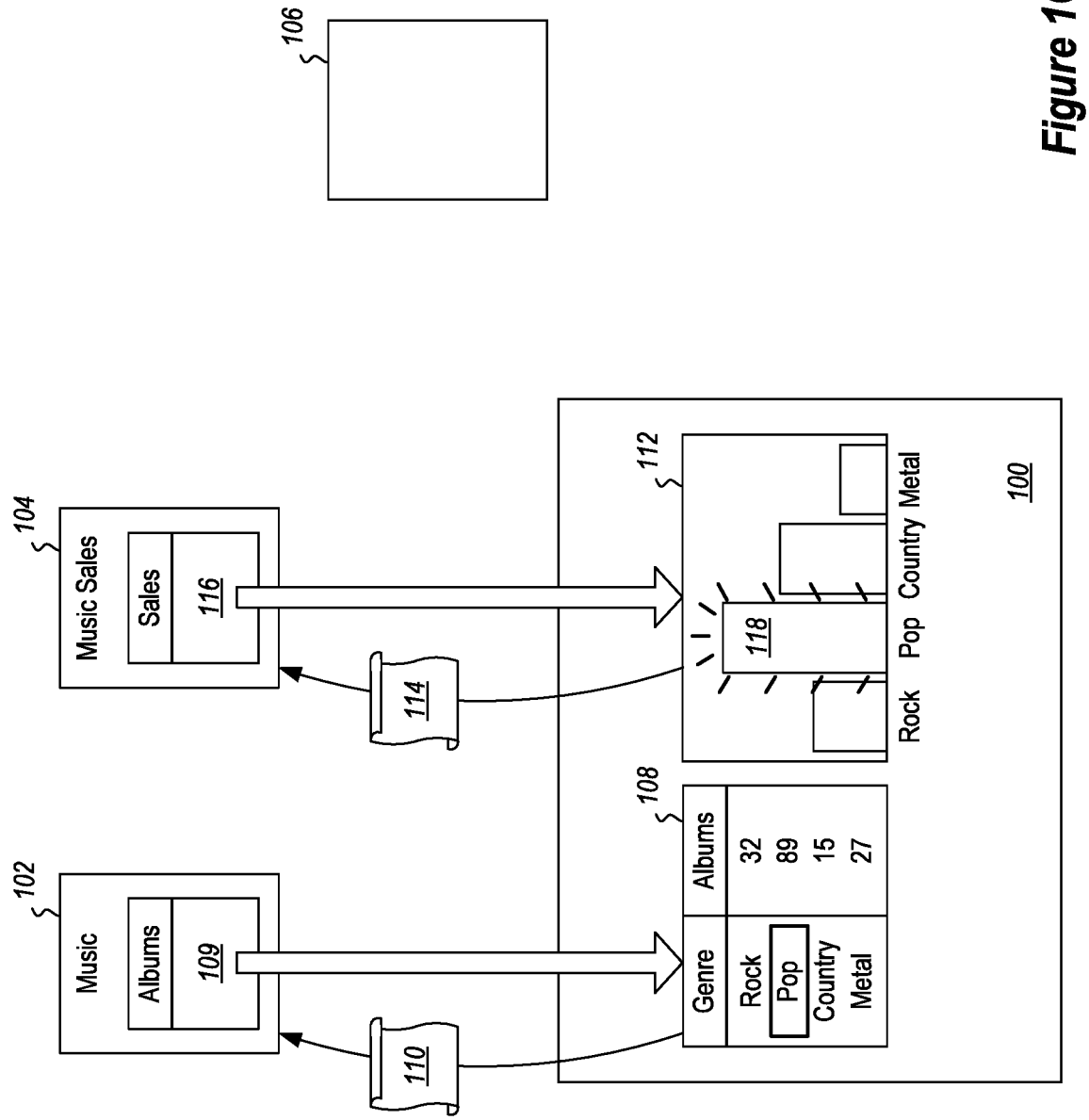
FIG. 1C illustrates an additional example of cross model filtering of the different database queries from the client machine on the different database models.

Referring now to FIGS. 1A-1C, an example system is illustrated. In particular, FIG. 1A illustrates a first data store 102, referred to herein as the Music model and a second data store 104 referred to herein as the Music Sales model. While only two data stores are shown, it should be appreciated that embodiments can be implemented with virtually any number of data stores, but two are shown for convenience.

The illustrated example shows that if there exists inferable or definable relationships between multiple data models, filtering one visualization bound to a particular model based on selection of a value from another model may be performed. For example, in some embodiments, a filter may be applied to a query to a first model for the first visualization based on selection of a value or element from a second visualization for a second model. Additionally or alternatively, embodiments may highlight or otherwise ornament a portion of the first visualization based on selection of an element of the second visualization. The filter may be generated based on the definition of the relationship between the source and the target of the relationship. In the illustrated example, this relationship can be maintained by a relationship ontology illustrated at 106. The following illustrates the functionality.

In the example illustrated in FIG. 1A, there are two visuals shown on the screen of a client machine 100: The first is a column chart 108 showing the total number of albums per music genre (e.g.: total number of albums for Pop, Rock, etc.). The information in the column chart 108 is sourced by sending a query 110 to the Music model 102 which returns the information displayed in the column chart 108. In particular, the information is sourced from the Albums table 109 in the Music model 102. The second visualization shows the total sales per music genre as a bar chart 112. This data is obtained by sending a query 114 to the Music Sales model 104 to query the Sales table 116 in the Music Sales model.

Referring now to FIGS. 1A and 1B, when a user selects the Pop genre (as shown in FIG. 1B) in the column chart 108, embodiments may attempt to locate a relationship between the Music model 102 and the Music Sales model 104 based on the genre information. This may be formed, for example, by looking up a relationship between the Genre column in the Albums table 109 in the Music model 102 and the Genre column in the Sales table 116 in the Music Sales model 104. In the example illustrated, this lookup may be against a relationship ontology 106. For example, this information lookup may be performed against relationship metadata that is inferred automatically and stored in the relationship ontology 106. Additionally or alternatively, this information lookup may be performed against relationship metadata that is explicitly defined by the model designer and stored in the relationship ontology 106.

Relationships in the relationship ontology can be discovered or manually defined in a number of different ways. For example, in some embodiments, automatic discovery can be made by comparing column names in different tables. Columns with the same or very similar names from different models may be used to create a correlating ontology. For example, in the example illustrated in FIG. 1A, the Albums table 109 of the Music model 102 may have a column titles "Genre". Similarly, the Sales table 116 of the Music Sales model 104 may have a "genre" column. An inference engine at the relationship ontology 106 could determine that the different columns from the different data models stored entries for the same or substantially the same data items or data vales.

It should be appreciated that relationships could be discovered in other ways as well. For example, different models may be defined in different cultural languages. Thus, columns named with substantially equivalent labels, but in different cultural languages may be correlated in the ontology 106. Similarly, labels with similar meanings may be correlated. For example, one model may include a column with a label "artist" where another model includes a column with a label "singer". In some embodiments, these columns may be correlated in an ontology 106.

Based on relationships discovered between the tables 109 and 116 various action may be performed. For example, as illustrated in FIG. 1B, a filter for Genre=Pop is appended to the query 114 for the Sales table 116 such that the second visual, i.e. the bar chart 112 is filtered to only show the total sales for the Pop genre. Alternatively or additionally, a filter for Genre=Pop is appended to the query 114 for the Sales table 116 so therefore the second visual, i.e. the bar chart 112, is filtered only to show the total sales for the Pop genre, perhaps broken down by another measure to show the distribution within a particular category. In yet another alternative or additional embodiment, as illustrated in FIG. 1C, the explicit bar 118 representing the value for total sales for the Pop genre is highlighted in bar chart 112.

The above filtering and highlighting can be applied to multiple visuals from multiple models at the same time so embodiments are not limited to two visuals from two models. Embodiments can use similar functionality to filter, highlight, slice, or drill in between one source visual/value and multiple other visualizations/queries.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
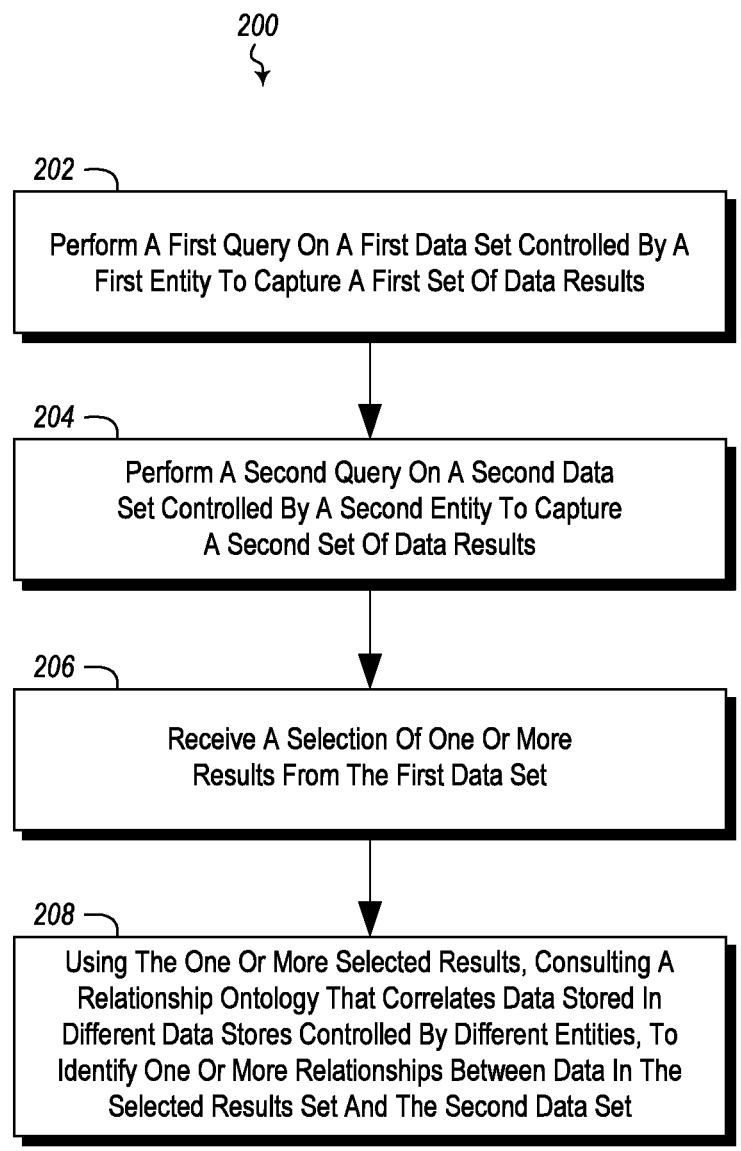
FIG. 2 illustrates a method of presenting data from different data providers in a correlated fashion.

Referring now to FIG. 2, a method 200 is illustrated. The method 200 may be practiced in a distributed computing environment. The method 200 includes acts for presenting data from different data providers in a correlated fashion. The method 200 includes performing a first query on a first data set controlled by a first entity to capture a first set of data results (act 202). For example, FIG. 1A illustrates a query 110 being sent to a data model 102 to obtain data for the column chart 108 visualization.

The method 200 further includes performing a second query on a second data set controlled by a second entity to capture a second set of data results (act 204). For example, FIG. 1A illustrates a query 114 being sent to a model 104 to obtain data for the bar chart 112 visualization.

The method 200 further includes receiving a selection of one or more results from the first data set (act 206). For example, as illustrated in FIGS. 1B and 1C, a user may select the "pop" entry in the column chart 108. Note however, that embodiments are not limited to "user selection" as illustrated, but rather selection may include any of a number of different activities. For example, a software application may select a result for further processing.

The method 200 further includes using the one or more selected results, consulting a relationship ontology that correlates data stored in different data stores controlled by different entities, to identify one or more relationships between data in the selected results set and the second data set (act 208). For example, as illustrated in FIGS. 1B and 1C, the client machine 100 may consult the ontology 106 to determine relationships between data from the first query to the data model 102 and data from the second query to the data model 104. These relationships may be used in various ways to manipulate visualizations, perform operations on data, etc.

The method 200 may further include constructing a new query over the second data set based on identifying one or more relationships between data in the selected results set and the second data set, and performing the new query on the second data set such that results from the new query are correlated with the selection of the one or more results. For example, a new query could be issued on the Sales table 116 limiting results to those where the Genre is Pop. This would affect the data returned from the data model 104 and the visualization displayed.

The method 200 may further include performing additional operations on the second set of data results based on the relationships between data in the selected results set and the second data set. For example, performing additional operations on the second set of data results may include highlighting element in the second data set. Alternatively or additionally, performing additional operations on the second set of data results may include analyzing results in the second data set. Alternatively, performing additional operations on the second set of data results may include categorizing results in the second data set. Alternatively or additionally, performing additional operations on the second set of data results may include sorting results in the second data set. Alternatively or additionally, performing additional operations on the second set of data results comprises filtering results in the second data set.

The method 200 may further include displaying a correlation between the first data set and the second data set. For example, selection of elements in the first data set may result in displaying the second data set with correlating data highlighted.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of constructing data from different data providers in a correlated fashion, the method being performed by one or more processors of a computer system, the method comprising:

performing a first query on a first data set controlled by a first entity to capture a first set of data results;

performing a second query on a second data set controlled by a second entity to capture a second set of data results, wherein the second query is generated independently from the first query such that the second query is distinct from, and not dependent on, the first query;

receiving a selection of one or more results from the first set of data results;

subsequent to performing both the first query and the second query, using the selection of the one or more results from the first set of data results to:

consult a relationship ontology that correlates data stored in different data stores controlled by different entities, the correlated data including correlations between the first data set controlled by the first entity and the second data set controlled by the second entity, and identify, from the relationship ontology, at least one relationship between data in the selection of the one or more results from the first set of data results and the second set of data results; and performing a new query over only the second data set to generate a new set of data results, the new query being constructed based on the identified at least one relationship such that the new set of data results are correlated with the selection of the one or more results from the first set of data results.

2. The method of claim 1, wherein the at least one relationship stored in the relationship ontology is manually defined.

3. The method of claim 1 further comprising:

performing an additional operation on the second set of data results based on the identified at least one relationship between the data in the selection from the first set of data results and the second set of data results.

4. The method of claim 3, wherein the additional operation comprises highlighting an element in the second set of data results.

5. The method of claim 3, wherein the additional operation comprises categorizing the second set of data results.

6. The method of claim 3, the additional operation comprises sorting the second set of data results.

7. The method of claim 3, wherein the additional operation comprises filtering the second set of data results.

8. The method of claim 1, further comprising:

displaying a correlation between the first set of data results and the second set of data results.

9. A system for constructing data from different data providers in a correlated fashion, the system comprising:

one or more processors; and one or more computer readable hardware storage devices having stored thereon computer executable instructions that are executable by at least one of the one or more processors to cause the system to:

perform a first query on a first data set controlled by a first entity to capture a first set of data results;

perform a second query on a second data set controlled by a second entity to capture a second set of data results, wherein the second query is generated independently from the first query such that the second query is distinct from, and not dependent on, the first query;

receive a selection of one or more results from the first set of data results;

subsequent to performing both the first query and the second query, use the selection of the one or more results from the first set of data results to:

consult a relationship ontology that correlates data stored in different data stores controlled by different entities, the correlated data including correlations between the first data set controlled by the first entity and the second data set controlled by the second entity, and identify, from the relationship ontology, at least one relationship between data in the selection of the one or more results from the first set of data results and the second set of data results; and perform a new query over only the second data set to generate a new set of data results, the new query being constructed based on the identified at least one relationship such that the new set of data results are correlated with the selection of the one or more results from the first set of data results.

10. The system of claim 9, wherein the at least one relationship stored in the relationship ontology is manually defined.

11. The system of claim 9, wherein execution of the computer-executable instructions further causes the system to:

perform an additional operation on the second set of data results based on the identified at least one relationship between the data in the selection from the first set of data results and the second set of data results.

12. The system of claim 11, wherein the additional operation comprises highlighting an element in the second set of data results.

13. The system of claim 11, wherein the additional operation comprises filtering the second set of data results.

14. The system of claim 9, wherein the first data set is stored in a first table that includes column labeling and the second data set is stored in a second table that also includes column labeling, and wherein the computer executable instructions further cause the system to:

identify a first column of information in the first table, the first column including substantially similar information as a second column of information in the second table;

identify a first column label corresponding to the first column, the first column label being named differently than a second column label corresponding to the second column; and in the relationship ontology, correlate the first column of information in the first table with the second column of information in the second table even though the first column label is named differently than the second column label.

15. The system of claim 14, wherein the first column label is expressed using a first language while the second column label is expressed using a second language.

16. The system of claim 14, wherein the second set of data results is displayed in a bar chart.

17. A physical computer readable hardware storage device comprising computer executable instructions that are executable by one or more processors to cause the one or more processors to:
- perform a first query on a first data set controlled by a first entity to capture a first set of data results;
- perform a second query on a second data set controlled by a second entity to capture a second set of data results, wherein the second query is generated independently from the first query such that the second query is distinct from, and not dependent on, the first query;
- receive a selection of one or more results from the first set of data results;
- subsequent to both the first query and the second query, use the selection of the one or more results from the first set of data results to:
  - consult a relationship ontology that correlates data stored in different data stores controlled by different entities, the correlated data including correlations between the first data set controlled by the first entity and the second data set controlled by the second entity, and
  - identify, from the relationship ontology, at least one relationship between data in the selection of the one or more results from the first set of data results and the second set of data results; and
- perform a new query over only the second data set to generate a new set of data results, the new query being constructed based on the identified at least one relationship such that the new set of data results are correlated with the selection of the one or more results from the first set of data results.

* * * * *